US012698754B2

(12) United States Patent
Gkountaras

(10) Patent No.: US 12,698,754 B2
(45) Date of Patent: Aug. 4, 2026

(54) CONTROL ARRANGEMENT OF A WIND POWER PLANT BY RELEASING STORED POWER

(71) Applicant: Siemens Gamesa Renewable Energy A/S, Brande (DK)

(72) Inventor: Aris Gkountaras, Hamburg (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 382 days.

(21) Appl. No.: 18/556,956

(22) PCT Filed: Mar. 22, 2022

(86) PCT No.: PCT/EP2022/057480
§ 371 (c)(1),
(2) Date: Oct. 24, 2023

(87) PCT Pub. No.: WO2022/228782
PCT Pub. Date: Nov. 3, 2022

(65) Prior Publication Data
US 2024/0209835 A1 Jun. 27, 2024

(30) Foreign Application Priority Data
Apr. 29, 2021 (EP) ...................................... 21171198

(51) Int. Cl.
*F03D 7/02* (2006.01)
*H02J 3/38* (2006.01)
(Continued)

(52) U.S. Cl.
CPC ............ *F03D 7/0284* (2013.01); *H02J 3/381* (2013.01); *H02J 13/12* (2026.01);
(Continued)

(58) Field of Classification Search
CPC ...................................................... F03D 7/0284
See application file for complete search history.

(56) References Cited

U.S. PATENT DOCUMENTS 10,584,679 B2 3/2020 Engelken et al.
2014/0070617 A1* 3/2014 Detmers ............... H02J 7/0071
307/64
(Continued)

FOREIGN PATENT DOCUMENTS

CN 103036249 A 4/2013
CN 104600742 A 5/2015
(Continued)

OTHER PUBLICATIONS

Al Kez Dlzar et al: "A critical evaluation of grid stability and codes, energy storage and smart loads in power systems with wind generation", Energy, Elsevier, Amsterdam, NL, vol. 205, Apr. 26, 2020 (Apr. 26, 2020), XP086207866, ISSN: 0360-5442, DOI: 10.1016/J.ENERGY.2020.117671.

*Primary Examiner* — Nathan L Laughlin
(74) *Attorney, Agent, or Firm* — Schmeiser Olsen PLLC

(57) ABSTRACT

A control arrangement of a wind power plant includes a number of wind turbines and a number of storage arrangements, which control arrangement includes a first monitoring module configured to determine a first power quantity stored in the rotating mass of a wind turbine; a computation module configured to predict a power curve progression during injection of the first power quantity into the grid and during a subsequent theoretical recovery phase; a second monitoring module configured to determine a second power quantity available in a storage arrangement; and a response management module configured to identify a time instant at which to commence release of the second power quantity in order to maintain the combined output power of the wind (Continued)

power plant at a pre-defined threshold during inertial response following a grid under-frequency event.

14 Claims, 8 Drawing Sheets

(51) Int. Cl.

| | | |
|---|---|---|
| *H02J 13/12* | (2026.01) | |
| *H02J 101/28* | (2026.01) | |
| *H02J 103/30* | (2026.01) | |

(52) U.S. Cl.

CPC ... *F05B 2270/1033* (2013.01); *F05B 2270/32* (2013.01); *F05B 2270/327* (2013.01); *F05B 2270/328* (2013.01); *H02J 2101/28* (2026.01); *H02J 2103/30* (2026.01)

(56) References Cited

U.S. PATENT DOCUMENTS

| | | | | |
|---|---|---|---|---|
| 2014/0103655 A1* | 4/2014 | Burra | ..................... | F03D 7/028 |
| | | | | 290/44 |
| 2015/0159627 A1* | 6/2015 | Nielsen | .................. | F03D 80/60 |
| | | | | 290/44 |
| 2015/0381089 A1 | 12/2015 | Tarnowski et al. | | |
| 2017/0298904 A1 | 10/2017 | Nielsen | | |
| 2021/0281079 A1* | 9/2021 | Valcan | .................. | H02J 3/381 |
| 2022/0060025 A1* | 2/2022 | Skjelmose | ............. | H02J 3/381 |

FOREIGN PATENT DOCUMENTS

| | | |
|---|---|---|
| CN | 107959304 A | 4/2018 |
| CN | 111900742 A | 11/2020 |
| WO | 2012163355 A1 | 12/2012 |
| WO | 2018153526 A1 | 8/2018 |
| WO | 20190155323 A1 | 8/2019 |

* cited by examiner

CONTROL ARRANGEMENT OF A WIND POWER PLANT BY RELEASING STORED POWER

CROSS-REFERENCE TO RELATED APPLICATIONS

This application claims priority to PCT Application No. PCT/EP2022/057480, having a filing date of Mar. 22, 2022, which claims priority to EP Application No. 21171198.1, having a filing date of Apr. 29, 2021, the entire contents both of which are hereby incorporated by reference.

FIELD OF TECHNOLOGY

The following relates to a control arrangement of a wind power plant.

BACKGROUND

A wind power plant may comprise any number of wind turbines. It is usual to operate a wind power plant to convert as much wind energy as possible into electrical power, and to export this to a grid. Since wind speed fluctuates, commercially operated wind power plants generally deploy variable-speed wind turbines. A wind power plant must be controlled in such a way as to comply with various grid requirements, one of which is the ability to respond to grid under-frequency events in order to contribute to grid frequency stability. In case of a drop in grid frequency, a variable-speed wind turbine can release kinetic energy stored in its rotating mass. In this way, additional power can be injected into the grid for a short period of time, assisting the grid frequency to return to its nominal level. This inertial response may also be referred to as inertia emulation, virtual inertia and synthetic inertia. It has been proposed, for example in CN111900742A, to equip a wind energy plant with an additional flywheel and to release energy stored in the flywheel during inertial response.

However, the inertial response of a wind turbine is limited. Furthermore, the rotational speed of the wind turbine's aerodynamic rotor decreases as it releases the stored kinetic energy. When the aerodynamic rotor has slowed to its minimum allowable rotational speed, it takes some time for the wind turbine to recover towards its operating point prior to the under-frequency event.

Therefore, while it is possible to mitigate the drop in grid frequency using inertial response of the wind power plant, the grid frequency may exhibit a further subsequent "dip" or decrease during the recovery period of the wind power plant. As a result, it takes longer for the system frequency to return to its nominal value.

SUMMARY

An aspect relates to provide a way of operating a wind power plant to overcome the problem described above.

In the context of embodiments of the invention, a wind power plant (or "wind energy plant") shall be understood to comprise a number of wind turbines and a number of storage devices.

According to embodiments of the invention, the control arrangement comprises at least the following: a monitoring module configured to determine a first quantity of power stored in the rotating mass of a wind turbine at a current operating point; a computation module configured to predict the power curve progression during injection of the first power quantity into the grid and during a subsequent recovery phase towards the previous operating point; a monitoring module configured to determine a second quantity of power available in a storage device; and a response management module configured to identify a time instant at which to commence release of the second power quantity in order to maintain the combined output power of the wind power plant at pre-defined threshold during inertial response following a grid under-frequency event.

The first power quantity can be regarded as a "surplus power" or "power boost", i.e., the amount of power in excess of the power output at the operating point of the wind turbine. By releasing the kinetic energy stored in its rotating mass, a variable-speed wind turbine operating at a certain operating point (depending on various factors such as the current wind conditions) may be able to increase its power output for a brief period following a negative grid excursion. At some point following a grid under-frequency event, the rotor speed will have decreased to its minimum allowable speed and the store of kinetic energy will be depleted. The power curve progression then enters a deficit or recovery phase, as the rotor speed and power output increase once more towards the previous operating point. During this recovery period, the power output by a wind energy plant controlled using a conventional art approach is lower than the power it was generating prior to the negative frequency event. The duration of the recovery phase will depend on the time it takes for the rotational velocity of the aerodynamic rotor to increase.

An advantage of the inventive control arrangement is that, by identifying the optimal time to commence releasing the second quantity of stored power, as well as identifying the optimal shape of active power provision of this stored energy, a second frequency dip during the recovery period of the wind turbines can be avoided and the resulting combined active power provision of the power plant remains positive throughout the grid frequency event. Using the inventive control method, the power deficit of the power progression curve is negated by careful timed release of the additional power from the storage arrangement. In other words, the grid will not notice the recovery period of the wind energy plant and will not experience a secondary frequency dip. The inventive control method ensures positive active power provision following a grid under-frequency event, i.e., the total or net active power injected by the wind power plant into the grid remains above a pre-defined level following the grid frequency event, without any power deficit, and this pre-defined level is the power output immediately prior to the frequency event. By "cancelling out" the recovery period (during which a conventional art wind power plant delivers output power that is less than its previous output level), i.e., by timing the release of power from the storage arrangement in a more intelligent manner, the recovery period of the wind turbine will not have a negative effect on the grid.

According to embodiments of the invention, the method of controlling a wind power plant comprises the steps of determining a first quantity of power stored in the rotating masses of the wind turbines of the wind power plant; predicting the power curve progression through injection and recovery if the stored kinetic energy would be used to inject additional power into the grid; monitoring the change in wind speed during release of the stored kinetic energy of the wind turbine rotor; determining a second quantity of power available in storage devices of the wind power plant; and identifying a time instant at which to release the second power quantity in order to maintain the combined output power of the wind power plant above a pre-defined threshold during inertial response following a grid under-frequency event. The time instant is identified on the basis of the predicted power curve progression and the available second power quantity.

Various units or modules of the control arrangement can be completely or partially realized as software modules running on a processor of a controller of the wind power plant.

In the following, it may be assumed that the rotating mass of a wind turbine is its aerodynamic rotor, usually comprising three rotor blades mounted to a hub or spinner. It may also be assumed that a wind turbine is a variable-speed wind turbine with rotor blades that can be pitched to adjust the rotor speed and torque, and which can be controlled to provide inertial response following a negative grid frequency event. A negative frequency event can be identified by a grid frequency monitor, for example, as will be known to the skilled person. A variable-speed wind turbine may be assumed to include a power converter with a generator-side converter and a grid-side converter connected by a DC-link, and a converter controller.

The first power quantity is a measure of the kinetic energy stored in the rotating mass of a variable-speed wind turbine and may be referred to as the rotor kinetic energy. As explained above, the advantage of the inventive approach is that the total output power—power from the rotor kinetic energy plus stored power—can be maintained above a desired minimum level or threshold. In an embodiment of the invention, this threshold is the power output prior to the negative frequency event.

A suitable threshold may be identified during a planning stage of a wind power plant. In a further embodiment of the invention, therefore, the threshold is identified on the basis of the wind turbine types deployed in the wind power plant, and on the basis of the storage device types deployed in the wind power plant. For example, in a certain wind power plant with a plurality of wind turbines and a storage device for each wind turbine, a suitable threshold may be identified as: at least 90%, more desirably at least 95%, most desirably at least 99% of the power output level preceding the under-frequency event. The kinetic energy stored in the rotating mass of a wind turbine can be released by increasing the electrical torque of the generator through appropriate adjustment of converter control setpoints. This torque increase, under constant or falling wind speed will result in reduction of the rotational speed of the generator.

The power curve progression, i.e., the predicted shape of the power curve—is determined on the basis of various inputs such as wind speed, wind speed evolution during providing inertial response, pitch angle, rotational speed of the aerodynamic rotor, aerodynamic rotor speed deceleration rate, rotational speed of the generator rotor, grid frequency, etc. These parameters may be provided by various sensors, monitoring arrangements etc., as will be known to the skilled person.

The second monitoring module is configured to determine the second power quantity available in a storage arrangement, for example in one or more storage devices such as super-capacitors, batteries, flywheels, etc. The available quantity of power stored in these devices can be monitored using any suitable means, as will be known to the skilled person. Knowing the type(s) of storage device and the quantity of stored power, the response management module can determine the level of control with which the power can be released, and the most suitable point in time at which to commence release following a negative frequency event.

A wind power plant may be a wind park with many wind turbines, for example an offshore wind park with 100 or more wind turbines. It is generally the case that, at any one point in time, the wind turbines of a wind park will be operating at different setpoints chosen by the park controller to achieve a target output power. In other words, the quantities of kinetic energy stored in the rotors of the individual wind turbines may differ greatly. Therefore, the inventive method also comprises a step of determining the total amount of kinetic energy stored in the rotors of the wind turbines and using this information (as well as the monitored parameters mentioned above) to determine the shape of the inertial response of each individual wind turbine. In this way, different shapes of inertial response can be determined for each individual wind turbine to minimize the recovery period of the collective wind power plant as a whole. A central controller of the wind power plant dictates changes in the inertial response of each individual wind turbine, depending on the monitored parameters of the whole wind park with the aim of minimizing the recovery period of the inertial response of the collective wind power plant. The power available in the various storage arrangements is released as described above to optimize the recovery period of the wind power plant.

In an exemplary embodiment of the invention, the step of predicting the power curve progression comprises a step of identifying the time at which the power output decreases to the previous output power level. Similarly, in a further exemplary embodiment of the invention, the step of predicting the power curve progression comprises a step of identifying the power nadir, i.e., the lowest level of power output when the rotor speed has reduced to its minimum allowable level. With this information, the response management module can identify the optimal time at which to commence releasing the stored power, i.e., the response management module "works backwards" to identify the time at which the second power quantity should be injected into the grid to ensure that the total power remains close to the initial power output level.

The inventive control arrangement is configured to provide at least the first monitoring module and the computation module with real-time and/or predicted operating parameters. The operating parameters may comprise any of wind speed, aerodynamic rotor velocity, aerodynamic rotor deceleration rate, generator rotor velocity, etc.

The power curve progression PCP shall be understood as the shape of the power curve from the time at which inertial response begins to the time at which the speed of the rotating mass has recovered to its pre-event state. This power curve progression can be computed using various relevant parameters such as those mentioned above. It shall be understood that the shape of the power curve, i.e., the power curve progression, will depend on various factors such as the wind speed and rate of change of wind speed during the inertial response or "power boost". If the wind speed decreases significantly during the first phase of inertial response, the duration of the recovery period will be correspondingly longer because the new operating point of the turbine after inertial response will be lower than before. Similarly, if wind speed increases during the initial stage of inertial response, the recovery period will be shorter. The severity (duration) of the recovery period depends largely also on the predetermined value of active power increase, i.e., on the quantity of kinetic energy that can be stored in the rotor of the wind turbine. This value can be fixed for a wind power plant (e.g., 1%, 5%, 10% of nominal power) or it can change depending on the severity of the grid frequency event. For larger frequency disturbances it can be selected to provide a larger active power increase, resulting however in a steeper recovery period. The length of time for the wind turbine to return to its prior operating point is directly related to the magnitude of the power boost.

In an exemplary embodiment of the invention, a wind turbine of the wind power plant comprises a grid-forming inverter, instead of a grid-following inverter. During the inventive method, i.e., during primary response to a grid under-frequency event, the grid-side inverter of the wind turbine is operated in grid-forming mode. A grid-forming inverter refers to an inverter with the capability of controlling its terminal voltage (amplitude and phase) directly without the need to calculate the grid frequency explicitly. The inherent benefit of grid-forming inverters is that since no frequency measurement mechanism is present, they can react significantly faster to grid under-frequencies than converters without grid-forming control.

BRIEF DESCRIPTION

Some of the embodiments will be described in detail, with reference to the following figures, wherein like designations denote like members, wherein.

DETAILED DESCRIPTION

Figures 1, 2:
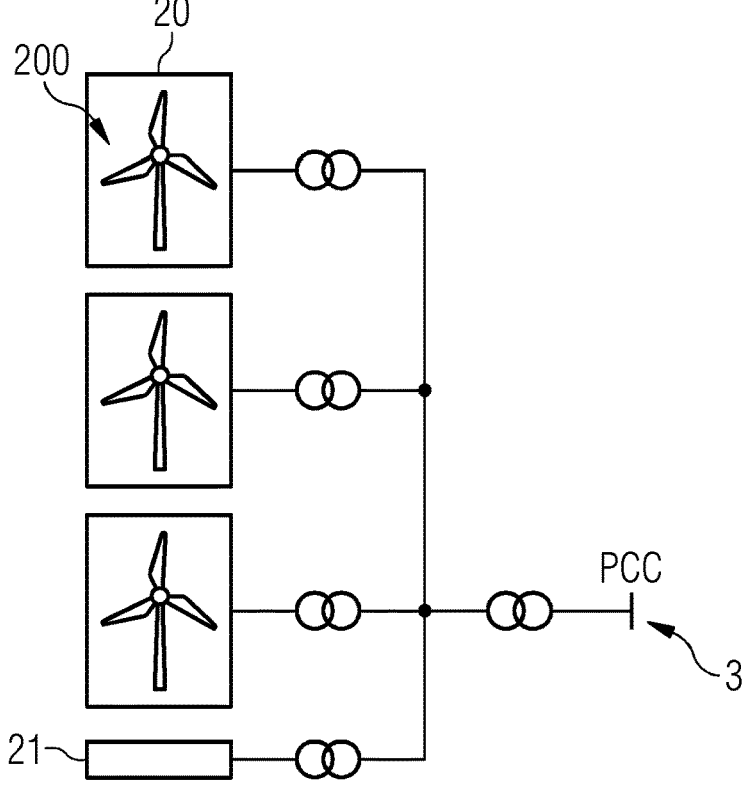
FIG. 1 shows an exemplary realization of a wind energy plant, with wind turbines and storage arrangements.
FIG. 2 shows an exemplary realizations of a wind power plant comprising storage arrangements.

FIGS. 1 and 2 each show an exemplary realization of a wind energy plant 2, with wind turbines 20 and storage arrangements 21. In FIG. 1, a storage arrangement 21 is provided at the LV side of a generator-side transformer. In FIG. 2, a storage arrangement 21 is provided at the MV side of a generator-side transformer. The total combined power is fed into a point of common connection (PCC) at the grid 3. A storage arrangement 21 can comprise one or more power storage devices that are maintained in a charged state, for example by using surplus wind power. A power storage device can be any of a super-capacitor, a battery, a flywheel, etc.

During normal operation of a wind energy plant 2, the total combined power originates from the wind turbines 20. A park controller (not shown) can issue setpoints to the wind turbines to ensure that the total combined power meets the grid requirements at any one time. In these exemplary embodiments, the storage arrangements 21 can contribute to the total combined power following a grid under-frequency event.

Figure 3:
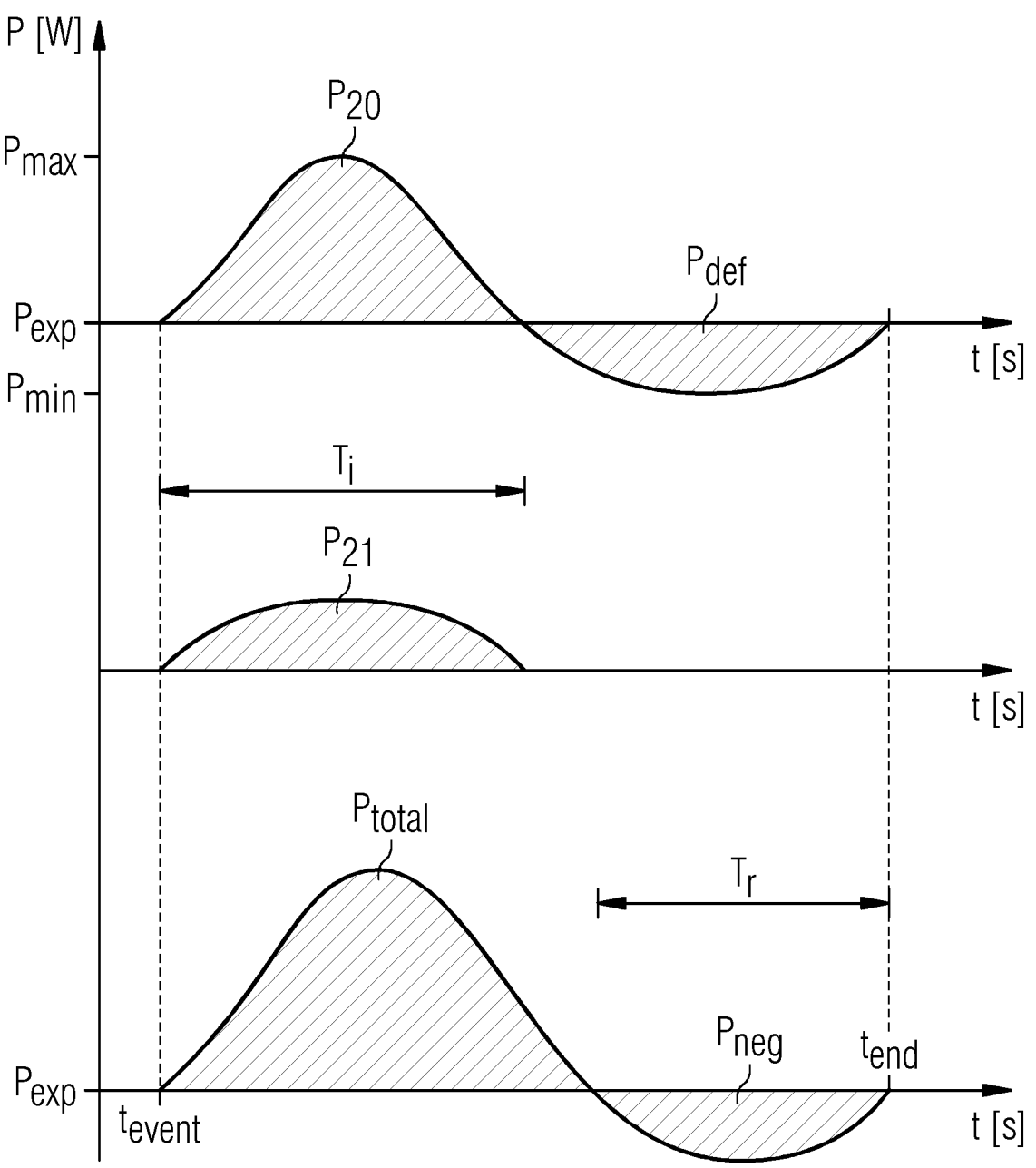
FIG. 3 shows power curves of a wind power plant controlled according to the conventional art.

During normal operation, the output power $P_{exp}$ depends on wind conditions and is referred to as the available power, since it is usually the maximum available power that can be harvested under the current wind conditions and exported to the grid. Following a grid under-frequency event at time $t_{event}$ as shown in FIG. 3, the kinetic energy stored in the rotating mass 200 can be released, i.e., additional power can be injected into the grid 3 during phase $T_i$ to contribute to grid stability. In the conventional art control method illustrated by this diagram, the output power drops at some point to a minimum or power nadir $P_{min}$ and the rotor is prevented from slowing down any further in order to avoid stalling. From this time $t_{min}$ onwards, the converter controller can issue appropriate control setpoints to allow the generator to increase speed during a recovery period $T_r$ to return towards the operating point prior to the frequency event, i.e., to return towards the previous level of output power $P_{exp}$.

In the conventional art as shown in FIG. 3, it is known to commence releasing power $P_{21}$ from an additional storage arrangement as soon as the negative frequency event is reported, i.e., at time $t_{event}$. However, after reaching the maximum total power output, the combined output power $P_{total}$ drops to an unfavorably low level, manifesting as a pronounced power "dip" to the power nadir $P_{min}$ during the recovery period $T_r$ in which the wind energy plant strives to return towards its previous operating point. The resulting power deficit $P_{neg}$ contributes to the second frequency "dip" referred to in the introduction and shown in FIG. 4, which indicates a desired or benchmark frequency response 40 for an exemplary power network fed by (amongst others) a wind power plant, and wherein the nominal grid frequency is 60 Hz. The diagram also shows two possible response curves. A first curve 41 shows the frequency response in the case that the wind power plant does not provide inertial response. In this case, the grid frequency is not prevented from dropping to an unfavorably low level near 58.2 Hz. However, the grid requirement, indicated by curve 40, states that the frequency may not drop below 58.4 Hz. Such a wind power plant would therefore fail to comply with the benchmark frequency response. By constructing the wind power plant to provide inertial response (e.g., using variable-speed wind turbines), it is possible to fulfil this requirement as indicated by curve 42. However, owing to the depletion of the stored kinetic energy and the ensuing recovery time, the frequency response 41 exhibits a second undesirable "dip" in grid frequency from about 59 Hz down to 58.8 Hz. In a grid dominated by wind power plants, this second under-frequency event may be even more severe than the first under-frequency event. In such a scenario, with a second dip being more severe than the initial under-frequency, the inertial response of the wind power plant would have worsened the transient event and would have failed to make a positive contribution towards restoring grid frequency. Severe frequency dips can lead to load shedding or even to blackouts in extreme cases.

It may take quite some time for the system to return to the nominal frequency (60 Hz in this example). The primary response stage begins with the first few seconds and can last up to a few minutes. During this transient grid state, a grid operator attempts to bring the grid frequency back towards its nominal power with appropriate primary response switching events. At the conclusion of primary response, the grid frequency may have returned to a higher level (59.6 Hz in this example). It is then the task of secondary and tertiary reserve to bring the system back to its nominal frequency, and this can take up to several hours. Similar frequency curves would apply for a different nominal system frequency, for example 50 Hz.

Figure 5:
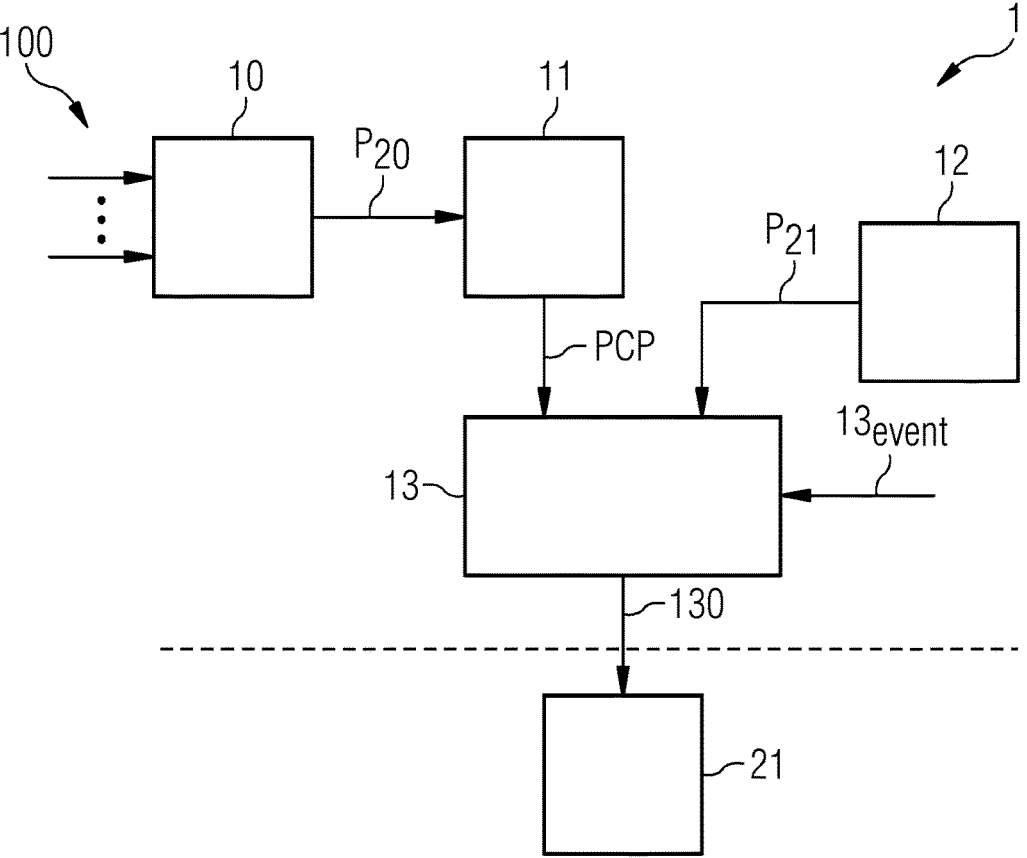
FIG. 5 is a block diagram of an embodiment of the inventive control arrangement.
Figure 6:
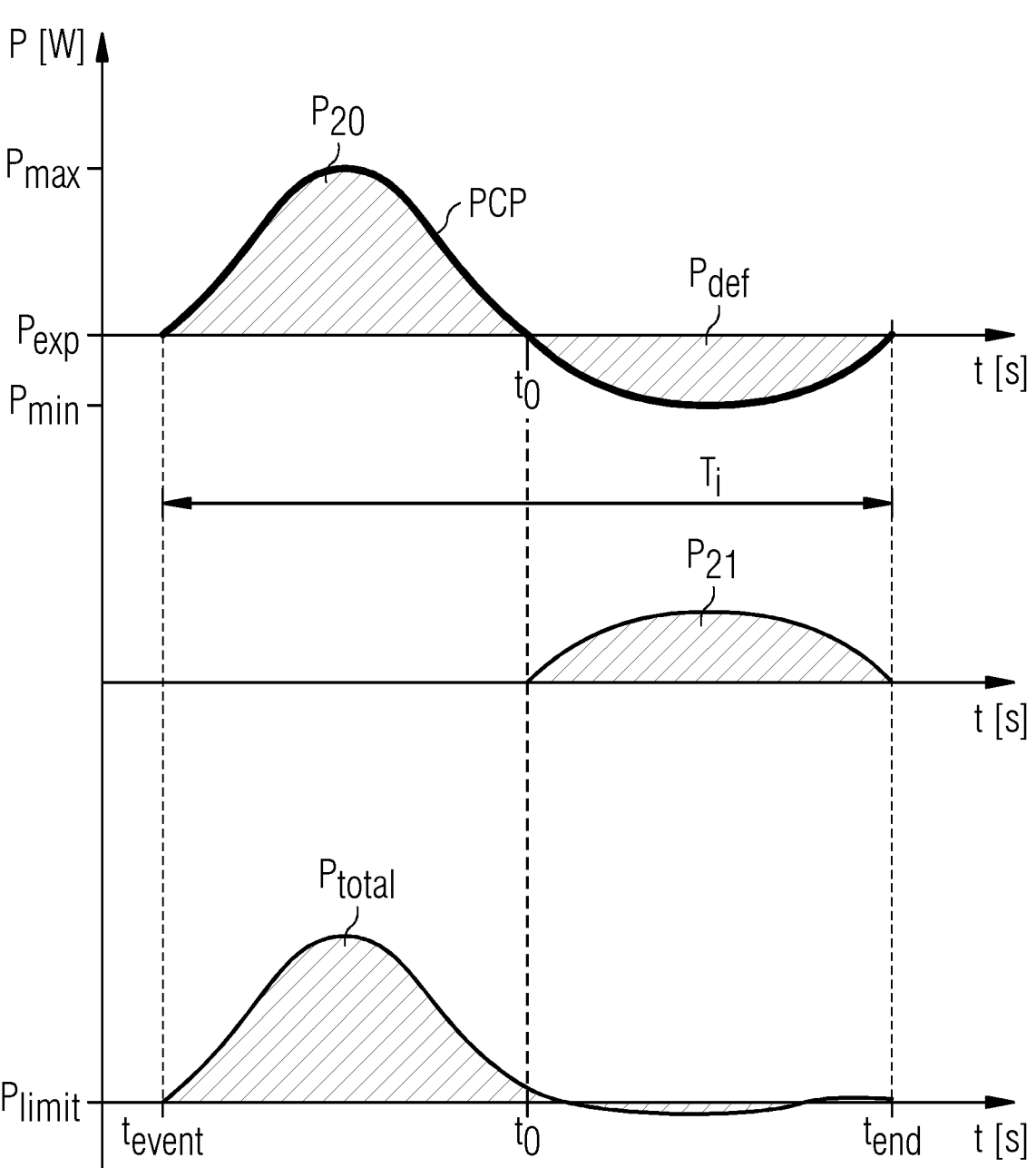
FIG. 6 shows power curves of a wind power plant controlled according to the inventive method.

FIG. 5 is a simplified block diagram of an embodiment of the inventive control arrangement 1, and FIG. 6 shows exemplary power curves during an inertial response situation. As explained above, the wind power plant 2 comprises a number of wind turbines 20 and a storage arrangement 21 comprising one or more power storage devices 21. The wind power plant 2 can provide inertial response following a grid under-frequency event. The control arrangement 1 comprises a monitoring module 10 which is realised to determine the power $P_{20}$ stored in the rotating mass 200 of a wind turbine 20 at any one time, for example at the current operating point. A computation module 11 is configured to predict the power curve progression PCP if the first power quantity $P_{20}$ were to be injected into the grid. The power curve progression PCP describes the shape of the power curve during injection (timespan $T_i$) and subsequent recovery (timespan $T_r$) towards an operating point for the hypothetical case in which only the stored kinetic energy would provide the power boost in response to a grid under-frequency event. The monitoring module 10 is configured to relate the quantity of stored power $P_{20}$ (i.e. the magnitude of this "power boost") to the time it would take for the wind turbine to return to the prior operating point, and to predict the shape of the power curve PCP. With this information, it is possible to determine the area of the "power deficit" $P_{def}$, i.e the area defined by the horizontal axis (the previous power output $P_{exp}$) and the PCP curve for all values of output power less than the previous power output $P_{exp}$. In this exemplary embodiment, the operating point is the initial output power level $P_{exp}$. The stored power $P_{20}$ available in the rotating mass 200 and the associated power curve progression PCP can be computed from various inputs 100, for example wind speed, pitch angle, aerodynamic rotor velocity, aerodynamic rotor deceleration rate, generator rotor velocity, etc. A second monitoring module 12 keeps track of a second power quantity $P_{21}$ available in the storage arrangement 21. For example, the available power quantity $P_{21}$ can be tracked in real time by individual storage controllers. With suitable communication links between the distributed individual storage controllers and the central monitoring module 10, this can keep track of the total power quantity $P_{21}$ available in the storage arrangement 21.

In the event of a drop in grid frequency at time $t_{event}$, this is reported to the control arrangement 1, for example as an input signal $13_{event}$ to a response management module 13. Knowing the quantity of stored power $P_{20}$ available from the kinetic energy of the rotating mass, the power curve progression PCP, and the second power quantity $P_{21}$, the response management module 13 identifies the optimal time instant $t_0$ at which to commence releasing the second power quantity $P_{21}$ so that the combined output power $P_{total}$ of the wind power plant 2 will remain above a pre-defined threshold $P_{limit}$, in this case the power output $P_{exp}$ immediately preceding the under-frequency event. Alternatively, this pre-defined threshold $P_{limit}$ may be defined as a percentage of the previous output level $P_{exp}$, for example $0.95P_{exp}$ or $0.99P_{exp}$. The second power quantity $P_{21}$ can be released in a controlled manner by issuing an appropriate setpoint 130 or sequence of setpoints 130. The outcome of this controlled power release over phase $T_i$ (until the second power quantity $P_{21}$ is depleted) is a combined output power $P_{total}$ that does not exhibit any "deficit", i.e., without any recovery phase as is the case in the conventional art and explained in FIG. 3. This is because the stored power is released in such a way as to cancel out the power deficit area $P_{def}$ of the power curve progression PCP, i.e., the region of the power curve progression PCP below the level of the power output $P_{exp}$ immediately preceding the under-frequency event.

The monitoring module keeps track of the power stored in the available storage device(s). With this information, the response management module can identify the time instant $t_0$ at which to commence releasing the second power quantity $P_{21}$ in order to maintain the combined output power above the pre-defined threshold up until time $t_{end}$. For example, the response management module 13 may determine the expected rates of increase and decrease in total power output, as well as the shape of the total power curve, in order to determine a favourable time instant $t_0$. A storage device such as a flywheel may release energy at a slower rate than a battery, for example, one type of storage device may release a large quantity of power in a brief time, compared to another type of storage device which may release its stored power in a slower manner.

Figure 4:
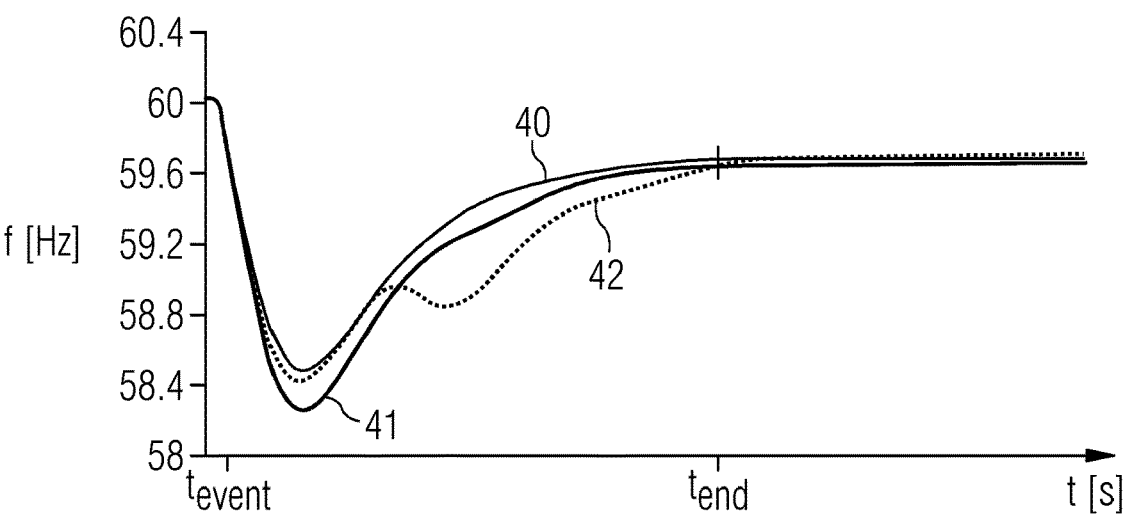
FIG. 4 shows frequency response of a wind power plant controlled according to the conventional art.
Figure 7:
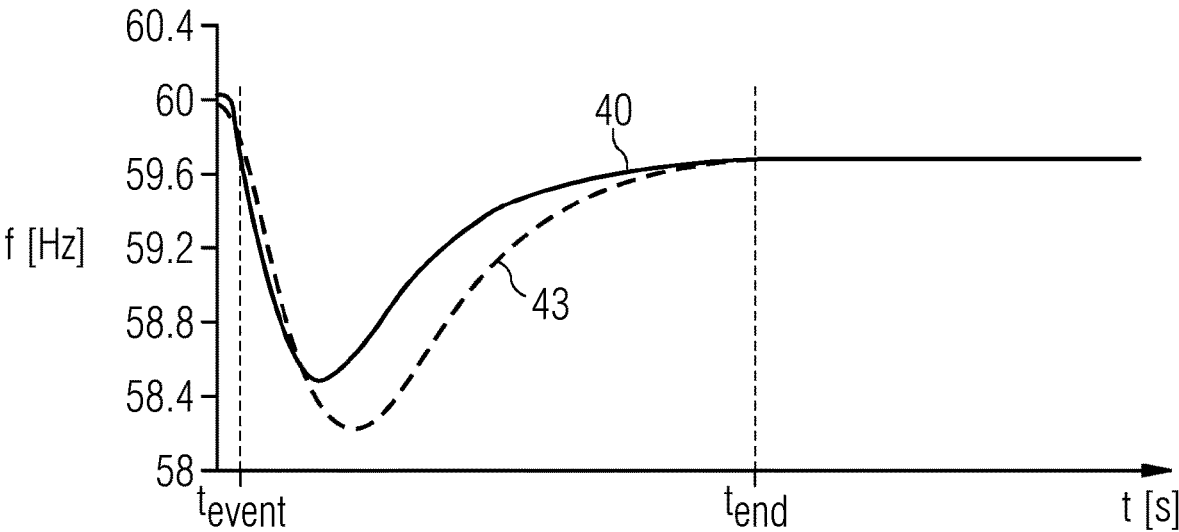
FIG. 7 shows a frequency response of a wind power plant controlled according to the inventive method.

FIG. 7 shows frequency response curves for an exemplary power network as explained in FIG. 4 above, with the benchmark curve 40 again showing the expected or required frequency response for this network fed by a wind power plant. Here, the curve 43 describes the frequency response when the grid is fed by a wind power plant controlled according to the inventive method. This curve 43 achieves the benchmark minimum frequency, and essentially follows the benchmark curve 40 as the grid frequency returns towards the nominal level. Because of the carefully choreographed release of stored power, there is no "second dip" in grid frequency, which instead follows a favorably smooth progression.

Figure 8:
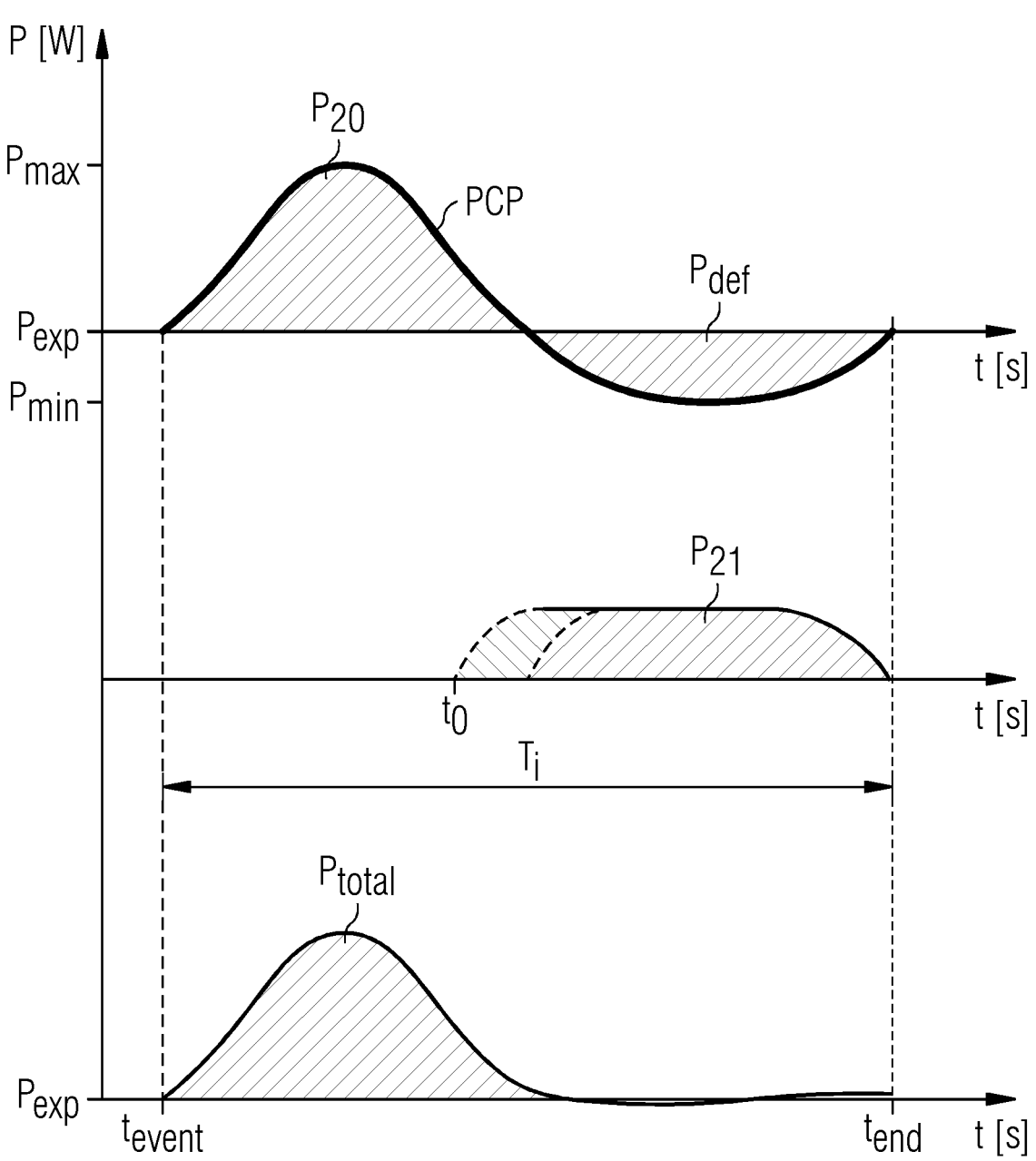
FIG. 8 shows power curves of a wind power plant controlled according to the inventive method.

FIG. 8 shows further exemplary power curves for a wind power plant controlled according to embodiments of the invention. Here, the quantity of power $P_{21}$ in the storage device arrangement is more than is needed to counteract the negative region of the power curve PCP (the surplus is indicated by the broken line), and the stored power $P_{21}$ is released in a controlled manner as described above so that the total combined output power or power boost $P_{total}$ is correspondingly larger (the additional quantity is indicated by the broken line), and also does not drop below the power output level $P_{exp}$ prior to the under-frequency event.

Figure 9:
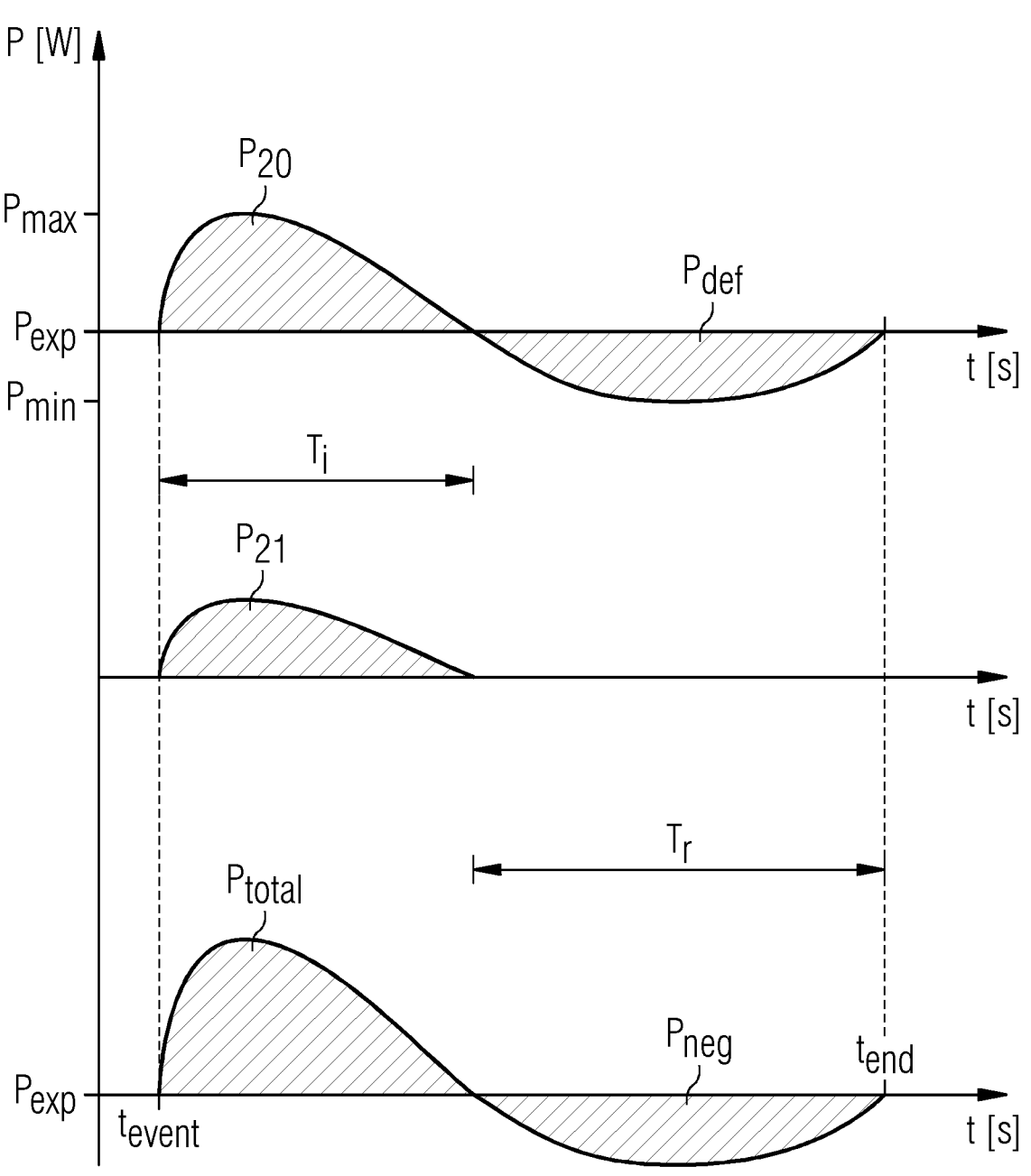
FIG. 9 shows power curves of a wind power plant controlled according to the conventional art.

As explained above, a wind power plant can be configured to deploy a grid-forming inverter. FIG. 9 shows power curves of such a wind energy plant controlled using the conventional art approach. With a grid-forming configuration, the stored power $P_{20}$, $P_{21}$ is released at a greater rate, and the maximum of the power boost $P_{total}$ is reached sooner. However, the system still shows a pronounced power "dip" $P_{neg}$ and recovery period $T_r$ during which the wind energy plant must return towards its previous operating point.

Figure 10:
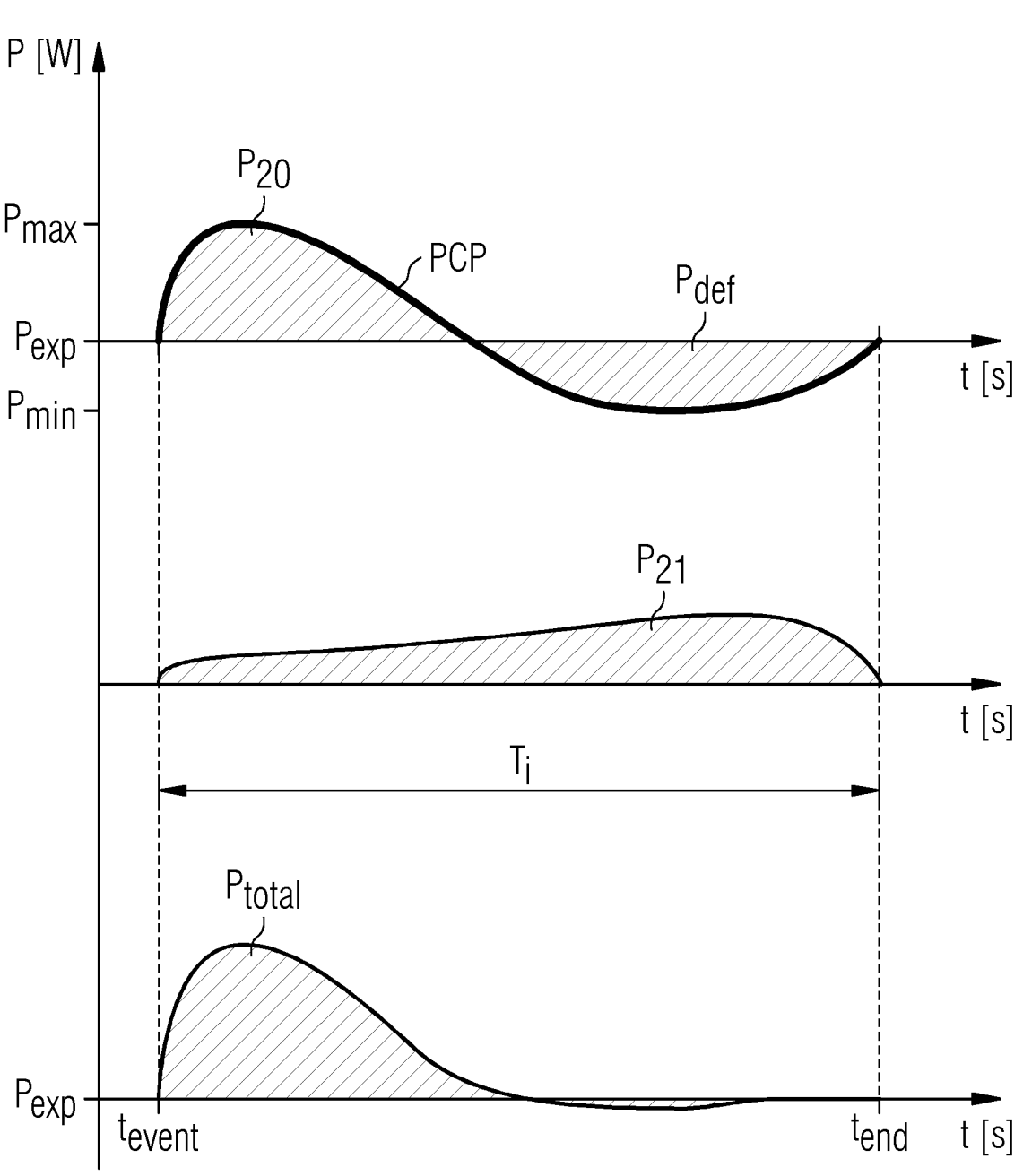
FIG. 10 shows power curves of a wind power plant controlled according to the inventive method.

FIG. 10 shows power curves for a wind energy plant with grid-forming functionality, controlled according to the inventive method. Release of the stored power $P_{21}$ commences at the beginning of the frequency event at time $t_{event}$, but in such a way as to compensate the negative region of the power curve progression PCP. With this approach, the amplitude of the combined stored power $P_{total}$ is lower in the first seconds compared to the conventional art approach shown in FIG. 9, but the wind energy plant avoids the negative effect of a recovery period seen in the conventional art approach of FIG. 9, since the output power remains essentially at the pre-event level $P_{exp}$.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention clamed is:

1. A wind power plant comprising a control arrangement, at least one wind turbine and at least one storage arrangement, which control arrangement comprises:

a first monitoring module configured to determine a first power quantity stored in the rotating mass of the at least one wind turbine;

a computation module configured to predict a power curve progression during injection of the first power quantity determined by the first monitoring module into a grid and during a subsequent recovery phase;

a second monitoring module configured to determine a second power quantity available in the at least one storage arrangement; and a response management module configured to identify, on the basis of the predicted power curve progression determined by the computational model and the second power quantity determined by the second monitoring module, a time instant at which to commence release of the second power quantity in order to maintain the combined output power of the wind power plant at a pre-defined threshold during inertial response following a grid under-frequency event, and wherein the at least one storage arrangement comprises a super capacitor, a battery and/or a flywheel.

2. The control arrangement according to claim 1, wherein the pre-defined threshold is a power output level preceding the grid under-frequency event.

3. The control arrangement according to claim 1, wherein the pre-defined threshold comprises at least 90%, at least 95%, or at least 99% of a power output level preceding the grid under-frequency event.

4. The control arrangement according to claim 1, configured to provide at least the first monitoring module with operating parameters of the wind power plant.

5. The control arrangement according to claim 1, wherein operating parameters comprise wind speed, pitch angle, aerodynamic rotor velocity, aerodynamic rotor deceleration rate and/or generator rotor velocity.

6. A method of controlling a wind power plant to provide inertial response following a grid under-frequency event, the wind power plant comprising at least one wind turbine and at least one storage arrangement, which method comprises the steps of:

determining a first power quantity stored in the rotating mass of the at least one wind turbine;

predicting the power curve progression during release of the first power quantity and during subsequent recovery;

determining a second power quantity available in the at least one storage arrangement; and, on the basis of the predicted power curve progression and the second power quantity, identifying a time instant at which to commence release of the second power quantity in order to maintain the combined output power of the wind power plant at a pre-defined threshold, wherein the at least one storage arrangement comprises a super capacitor, a battery and/or a flywheel.

7. The method according to claim 6, wherein the power curve progression is computed at least on the basis of current operating parameters.

8. The method according to claim 6, wherein current operating parameters comprise wind speed, aerodynamic rotor velocity, aerodynamic rotor deceleration rate and/or generator rotor velocity.

9. The method according to claim 6, wherein the step of predicting the power curve progression comprises a step of identifying a time at which the power output will decrease to a previous output power level.

10. The method according to claim 6, wherein the step of predicting the power curve progression comprises a step of computing a minimum power output.

11. The method according to claim 6, wherein the at least one storage arrangement further comprises an additional wind turbine and further comprising a step of controlling the rotating mass of the additional wind turbine.

12. The method according to claim 6, wherein the at least one wind turbine comprises a grid-forming inverter, and wherein the grid-forming inverter of the at least one wind turbine is operated in grid-forming mode.

13. The method according to claim 6, wherein the at least one storage arrangement comprises a grid-forming inverter, and wherein the grid-forming inverter of the at least one storage arrangement is operated in grid-forming mode.

14. A computer program product, comprising a computer readable hardware storage device having computer readable program code stored therein, said program code executable by a processor of a computer system comprising a computer program that is directly loadable into a memory of the control arrangement according to claim 1 and which comprises program elements for performing steps when the computer program is executed by the control arrangement.

* * * * *